(12) United States Patent
March et al.

(10) Patent No.: US 11,292,512 B2
(45) Date of Patent: Apr. 5, 2022

(54) ELECTRICAL POWER ASSISTED STEERING SYSTEM

(71) Applicant: TRW Limited, Solihull (GB)

(72) Inventors: Philip March, Leicester (GB); Nikhil Koppattil Prahlad, Solihull (GB); Xiao-Dong Sun, Solihull (GB)

(73) Assignee: TRW LIMITED, Solihull (GB)

( * ) Notice: Subject to any disclaimer, the term of this patent is extended or adjusted under 35 U.S.C. 154(b) by 498 days.

(21) Appl. No.: 15/538,715

(22) PCT Filed: Dec. 22, 2015

(86) PCT No.: PCT/GB2015/054133
§ 371 (c)(1),
(2) Date: Jun. 22, 2017

(87) PCT Pub. No.: WO2016/102962
PCT Pub. Date: Jun. 30, 2016

(65) Prior Publication Data
US 2018/0009469 A1    Jan. 11, 2018

(30) Foreign Application Priority Data

Dec. 22, 2014 (GB) .................................. 1422998.3

(51) Int. Cl.
*B62D 5/04* (2006.01)
(52) U.S. Cl.
CPC .......... *B62D 5/0484* (2013.01); *B62D 5/049* (2013.01); *B62D 5/0463* (2013.01)
(58) Field of Classification Search
CPC .. B62D 5/0463; B62D 5/0481; B62D 5/0484; B62D 5/049
See application file for complete search history.

(56) References Cited

U.S. PATENT DOCUMENTS 6,148,949 A * 11/2000 Kobayashi ........... B62D 5/0463
180/404
10,377,415 B2 * 8/2019 Lee ...................... B62D 5/0484
(Continued)

FOREIGN PATENT DOCUMENTS

EP    1900606 A2    3/2008
EP    1127775 A1    8/2011
(Continued)

OTHER PUBLICATIONS

Patent Acts 1977: Search Report under Section 17(5), Application No. GB1422998.3 dated Jun. 16, 2016.
(Continued)

*Primary Examiner* — Minnah L Seoh
*Assistant Examiner* — Maurice L Williams
(74) *Attorney, Agent, or Firm* — Tarolli, Sundheim, Covell & Tummino LLP (57) ABSTRACT

A method of operating an electric power assisted steering system of the kind in which an electric motor applies an assistance torque to a part of the steering system as a function of an assistance torque signal, the assistance torque reducing the force required by the driver to turn a steering wheel, comprises during normal operation generating an assistance torque signal that is dependent on the torque applied by the driver, and during a fault operation in which the torque applied by the driver is not reliably known to the system generating an assistance torque signal that is derived from a first term that has a value that varies as a function of the angular position of the steering relative to a changeable datum, the angular position of the changeable datum being updated in the event that the direction of rotation of the steering changes.

3 Claims, 7 Drawing Sheets

(56) References Cited

U.S. PATENT DOCUMENTS

| | | | |
|---|---|---|---|
| 2009/0281692 A1 | 11/2009 | Tamaizumi et al. | |
| 2012/0312627 A1* | 12/2012 | Morishita | B62D 5/0463 |
| | | | 180/446 |
| 2013/0304327 A1* | 11/2013 | Morishita | B62D 5/0463 |
| | | | 701/43 |
| 2014/0158453 A1* | 6/2014 | Takaki | G01D 5/244 |
| | | | 180/404 |

FOREIGN PATENT DOCUMENTS

| | | |
|---|---|---|
| EP | 2662266 A1 | 11/2013 |
| JP | 2004338562 A | 12/2004 |
| JP | 2007182186 A | 7/2007 |
| JP | 2009143484 A | 7/2009 |
| JP | 2011131629 A | 7/2011 |
| JP | 2014004920 A | 1/2014 |

OTHER PUBLICATIONS

PCT Search Report and the Written Opinion, Application No. PCT/GB2015/054133 filed Dec. 22, 2015, dated Apr. 6, 2016.
Japanese Notification of Reasons for Rejection, Application No. JP 2017-533827, dated Jul. 30, 2018.

\* cited by examiner

ELECTRICAL POWER ASSISTED STEERING SYSTEM

CROSS-REFERENCE TO RELATED APPLICATIONS

This application is a national stage of International Application No. PCT/GB2015/054133, filed 22 Dec. 2015, the disclosures of which are incorporated herein by reference in entirety, and which claimed priority to Great Britain Patent Application No. 1422998.3 filed 22 Dec. 2014, the disclosures of which are incorporated herein by reference in entirety.

BACKGROUND OF THE INVENTION

This invention relates to electrical power assisted steering systems of the kind in which an electrical motor is adapted to apply an assistance torque to a steering component such as a steering column so as to reduce the driver effort required to control the vehicle.

In a simple electric power assisted steering system a torque sensor is provided which is arranged so that the level of torque in a steering column is measured. From this measurement a controller calculates the value of a torque demand signal that is indicative of the torque that is to be generated by an electric motor attached to the steering column. The motor applies a torque to the column of the same sense as that demanded by the driver and thus reduces the effort needed to turn the wheel.

A problem with this simple arrangement can occur in the event of a fault that causes the measurement of torque to be unreliable or unavailable. This may occur if there is a fault in the torque sensor itself, the output from the torque sensor, or a fault in any post processing of the signal from the torque sensor. If the torque measurement is unreliable, then it is generally considered unsafe to use that as the basis for calculating an assistance torque.

To ameliorate this problem, it is known to include some checking circuits that monitor the torque signal, and in the event that it is deemed to be unreliable the assistance torque may be reduced to zero, in effect reverting the vehicle to one with no steering assistance. This will usually lead to steering that is very heavy, and may make the vehicle undriveable. Suddenly removing the assistance at high speeds, for instance mid-corner, could also be dangerous so it is known to gradually reduce the assistance from the last known safe value.

Attempts have been made to provide some level of assistance when there is no reliable torque measurement. We are aware of DE102005005084 in which the relative angular position of two points on the steering shaft are measured and used to provide a crude estimate of torque in the event of failure of a torque sensor. Also, DE102008032081A1 discloses a method of operating a steering system in which an assist torque is calculated as a function of the angular position of the steering wheel, vehicle speed and steering angular velocity, based on a simple model of the vehicle dynamics.

BRIEF SUMMARY OF THE INVENTION

A feature of the present invention is to provide an improved system and method of operation that may ameliorate some of the limitations present in prior art solutions to the problem of unreliable torque measurements.

In accordance with a first aspect the invention provides a method of operating an electric power assisted steering system of the kind in which an electric motor applies an assistance torque to a part of the steering system as a function of an assistance torque signal, the assistance torque reducing the force required by the driver to turn a steering wheel, the method comprising during normal operation generating an assistance torque signal that is dependent on the torque applied by the driver, and during a fault operation in which the torque applied by the driver is not reliably known to the system generating an assistance torque signal that is derived from a first term that has a value that varies as a function of the angular position of the steering relative to a changeable datum, the angular position of the changeable datum being updated in the event that the direction of rotation of the steering changes.

Providing an assistance torque that varies as a function of steering wheel angle relative to a changing datum that is reset to a new position when the part of the steering system (typically the steering wheel, or steering column shaft, or torque sensor quill shaft or motor rotor) starts to rotate in a different direction to that in which it was last rotating, the new datum being set equal to the angle of the steering part when the reversal occurs, enables an amount of assistance to be applied that gives good steering response when the steering moves away from rest again. The use of this changeable datum allows the assist to be tailored to help the driver restart movement of the steering from any rest position.

The datum may be reset each time the steering changes direction or only when additionally one or more conditions are met at the time that the direction of rotation changes. The datum may not be reset under any other conditions, so the only time it may be reset may be when a reversal occurs.

The one or more conditions may include the value of the assistance torque signal at the time that a direction change occurs, but may also include the value of the first component of the assistance torque signal at the time that the reversal takes place.

The method may comprise monitoring the direction of rotation of the steering and from that determining if the direction of rotation has changed. To monitor the direction the method may comprise monitoring the angular velocity of the part of the steering system.

As the steering may be stationary for some time, the method may comprise storing in a memory the last direction of rotation and comparing this with the present direction of movement to detect a change in direction.

When a change is detected the value of the last direction of rotation stored in the memory may be updated.

Since there are only two possible directions of rotation, clockwise and anticlockwise, the method may store the information as a binary digit.

The method may comprise determining the datum when the normal mode of operation is being used, ready to be employed in generating an assistance torque signal in the event that the torque signal is lost or becomes unreliable.

In a preferred arrangement, the first component may vary at a high rate during an initial amount of angular movement of the steering away from the changing datum, and thereafter vary at a lower rate or become saturated and so not vary with any further increasing movement away from the datum. The region with a high rate of change may correspond to a range of angles from the datum to about 60 degrees, or about 90 degrees from the datum, after which the lower rate of change is applied.

This initial rapid increase helps the driver overcome the initial resistance of the vehicle to making a change in direction, giving an initial helping "kick".

The first component may vary in a linear or non-linear manner as the steering moves away from the position of the changing datum value. The component may generally vary as a linear function of steering position relative to the datum value over an initial range of angles.

The method may comprise modifying the value of the first component as a function of the vehicle speed. This may comprise scaling the value as a function of speed, typically reducing the value with increasing vehicle speed, or applying a limit to the maximum value as a function of vehicle speed. The amount of scaling may vary as a function of the angular position relative to the changing datum.

As such, a gain value may be determined as a function of vehicle speed and used during production the first component. Thus, the term may be calculated without limiting, using a look up table or function, and if the result exceeds the maximum determined by the vehicle speed may be limited to that maximum.

The method may comprise monitoring the steering column angular velocity, directly or indirectly, and updating the datum to the new angular position each time a reversal in the direction of rotation has been detected, optionally only updating if certain conditions are met as described above.

The method may also comprise generating an assistance torque, during the fault operation, by the step of generating a second component or term that varies as a function of the position of the steering qcol relative to the straight ahead position, the assistance torque being derived from a combination of the first component with the second component.

The method may comprise producing an assistance torque signal in the fault operation that includes a term produced by summing the first component and the second component.

The method may further comprise generating an assistance torque signal during the fault operation by the step of producing a third component that varies as a function of column angular velocity. This may be scaled down at increasingly high column velocities to prevent instability arising. It may comprise a PD (proportional and differential) style controller, with the value being regulated by both the steering angle relative to the changeable datum and the vehicle speed, to assist in the dynamics.

In the event that the steering comes to rest at a new position, not aligned with the presently used datum value, the first component may be reduced gradually to zero over a defined period of time. In this case, the steering direction has not reversed but there is a need to remove this assistance component as the steering is not moving.

Where the steering direction of rotation reverses, so that it does not come to rest, the value of the first component may be reversed.

The method may comprise producing an estimated steering assist torque by summing the first component with the second component and the third component.

The method may comprise limiting the value of the summed components as a function of both the steering column angle relative to the straight ahead position and the vehicle speed. When both high vehicle speeds and large column angles are present the summed components may be severely limited relative to other combinations of vehicle speed and column angles.

During normal operation the torque applied by the driver may be measured by a torque sensor to produce a torque signal.

The method may comprise a step of determining whether a reliable measure of torque is available, and switching from a normal mode of operation to a fault mode if it is not.

According to a second aspect the invention provides an electric power assisted steering system comprising a steering mechanism which operatively connects a steering wheel to the road wheels of the vehicle, an electric motor operatively connected to the steering mechanism; a torque sensor adapted to produce a torque signal indicative of the torque carried by a portion of the steering mechanism, and a signal processing means operable in a normal mode when the output signal of the torque sensor is reliably available and a fault mode when it is not, in which the signal processing means includes: a signal processing means which in the normal mode is adapted to generate an assistance torque signal that is dependent on the torque applied by the driver, and during a fault operation is adapted to generate an assistance torque signal that is independent of the driver applied torque, the signal processing means including a first sub-unit which in the fault mode generates a first term of the assistance torque signal that has a value that varies as a function of the angular position of the steering relative to a variable datum, the variable datum being reset when the direction of the rotation of steering reverses.

The signal processing means may further include a second processing sub-unit that in the fault mode generates a second component or term of the assistance torque signal that varies as a function of the position of the steering qcol relative to the straight ahead position, the assistance torque being derived from a combination of the first component with the second component.

The signal processing means may further include a third processing sub-unit that in the fault mode generates a third component of the assistance torque signal that varies as a function of column angular velocity.

The system may include a steering position sensor for producing a steering column position signal.

The system may include a column velocity signal generating means for produced a velocity signal indicative of the angular velocity of the steering wheel or steering column The column velocity signal generator may comprise a velocity sensor. Alternatively it may comprise a position sensor that generates a position signal that can be integrated over time to give a velocity signal.

The torque sensor may comprise a single sensor which is connected to the steering column or another mechanical component attached to it. It may be a virtual sensor that determines motor position simply by monitoring the currents flowing in the motor.

The first and second terms may vary with vehicle speed.

The changeable datum may only be updated on detecting a change in direction if one or more additional conditions are met. These may include the value of the assistance torque at the time of reversal being in a predefined range, or above or below a predefined level.

The signal processing unit may include one or more filters and limiter that are used to filter or limit the first, second and third terms, or the sums of those terms, in producing the assistance torque signal demand multiplier.

The system may include an area of electronic memory accessible to the signal processing means in which the functions, maps or look up tables defining the terms may be stored.

The signal processing unit may be implemented by a processor that executes program instructions stored in an area of the memory. The instructions may cause the processor to perform a number of distinct steps or functions, which define the different sub-units of the signal processing unit. However, it may be possible to implement the signal processing unit using discrete electronic components such as digital logic gates, a group of logic gates forming each sub-unit.

Other advantages of this invention will become apparent to those skilled in the art from the following detailed description of the preferred embodiments, when read in light of the accompanying drawings.

DETAILED DESCRIPTION OF THE INVENTION

Figure 1:
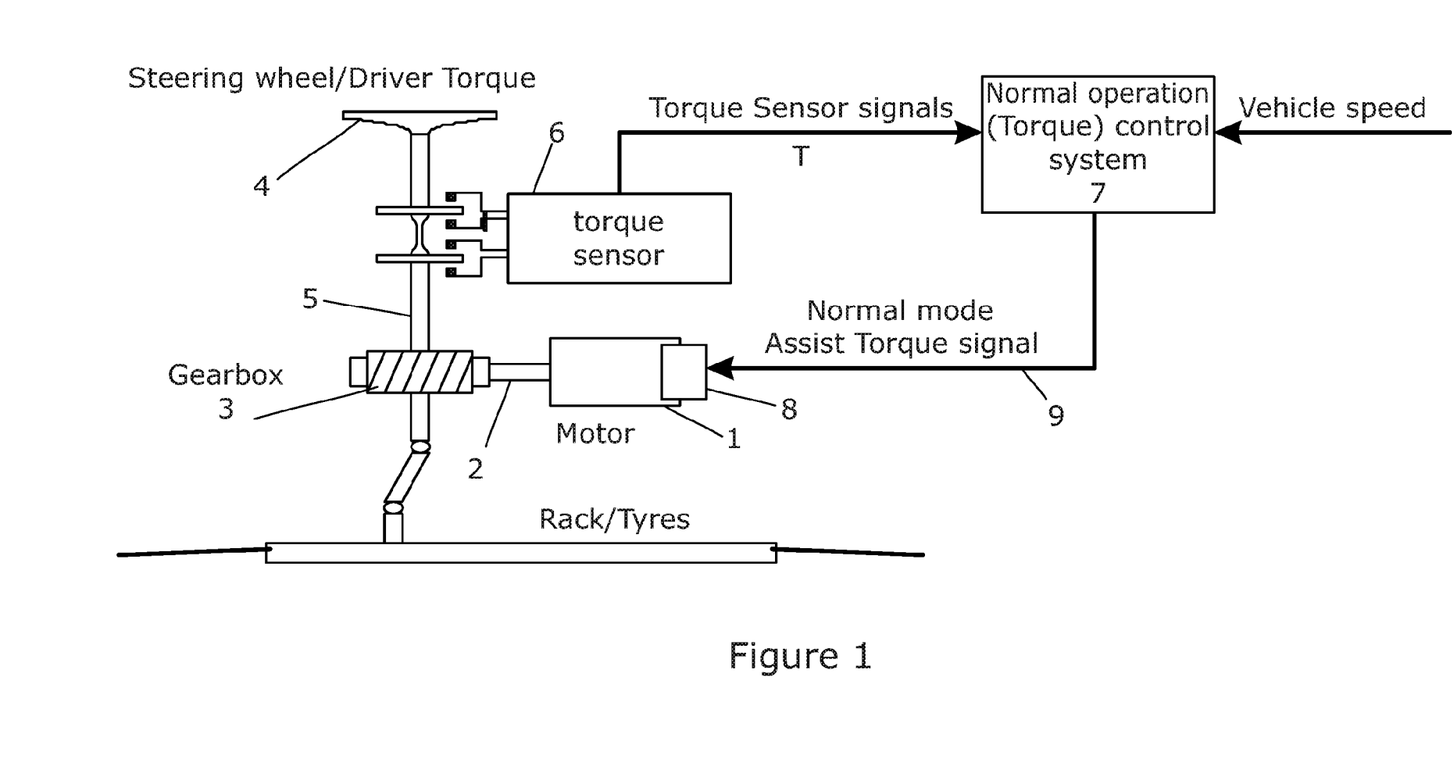
FIG. 1 is a schematic diagram of an electric power assisted steering system in accordance with the present invention working in a normal mode of operation.
Figure 2:
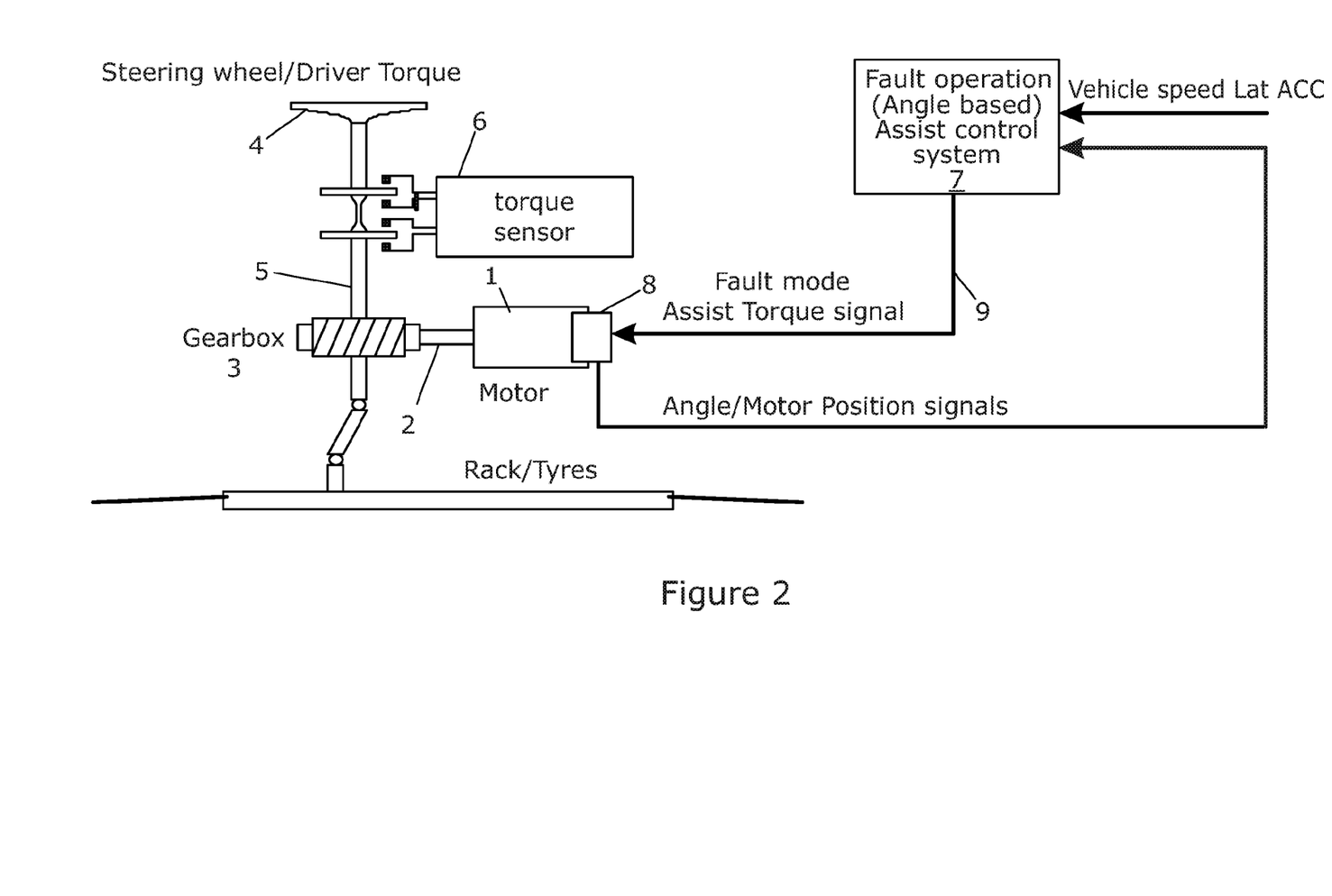
FIG. 2 is a schematic diagram of the electric power assisted steering system of FIG. 1 working in a fault mode of operation

A typical electric power assisted steering system is illustrated in FIG. 1 of the accompanying drawings. The system comprises an electric motor 1 which acts upon a drive shaft 2 through an (optional) gearbox 3. The drive shaft 2 terminates with a worm gear that co-operates with a wheel provided on a portion of a steering column 5 or a shaft operatively connected to the steering column, for example acting upon the steering rack. Of course, this is not to be taken as limiting to the scope of protection we are seeking, and other power assisted steering systems are envisaged to which the invention has application. The steering column can be rotated by the driver applying a torque to the steering wheel 4.

The steering column 5 carries a torque sensor 6 that is adapted to measure the torque carried by the steering column 5 that is produced by the driver of the vehicle as the steering wheel (not shown) and hence steering column is turned against the resisting force provided by the vehicles road wheels (also not shown). The output signal T from the torque sensor 6 is fed to a first input of a signal processing unit 7. A shown the torque sensor is a dual channel device having two sets of sensing elements, providing for a degree of redundancy and enhanced safety, but a single channel device could be used.

A motor angular position sensor is provided which produces an output signal indicative of the angular position of the motor. Because the motor is directly connected to the steering column, this in turn enables a signal indicative of the absolute angular position of the steering column qcol relative to a fixed datum to be produced. The fixed datum is usually set to be zero at the straight ahead position of the vehicle and varies linearly as the steering moves away from the straight ahead position, positive value indicating a position in one direction (for example clockwise) from the straight-ahead and negative values indicating a position in the other direction. This sensor may produce an output signal expressed in degrees of rotation or any other convenient scale.

As an alternative, an angular position sensor may be connected directly to the steering column in other arrangements, or may form a part of the torque sensor.

Lastly, the system includes sensors for measuring the vehicle speed and vehicle lateral acceleration which produce respective output signals Vspd and Vacc. These could be omitted and the appropriate signals may be taken from these sensors where already provided on the vehicle for use in other systems, such as ABS or stability control systems.

The signal processing unit 7 acts upon these signals to produce, as its output, an assistance torque signal 9 that is passed to a motor controller (not shown). The motor controller converts the assistance torque signal 9, which is indicative of an amount of assistance torque demanded from the motor, into drive currents for the electric motor 1. The motor is then driven by these drive currents by applying PWM modulation to the switches of a motor drive bridge as is known in the art.

To produce this assistance torque signal 9 the processing unit 7 includes a number of sub-units, each of which performs a single processing step or a specific set of steps. These units work together to provide two distinct modes of operation: a normal mode in which the assistance torque is primarily based on the torque signal output from the torque sensor, and a fault mode of operation in which an assistance torque is generated without use of the torque signal. These are explained in more detail below with reference to FIGS. 3 and 4 in particular.

In each mode of operation, the value of the torque assistance signal 8 corresponds to the amount of assistance torque to be applied to the steering column by the electric motor 1. The value will vary from a minimum value corresponding to maximum output torque for the motor in one sense, through zero torque when the demand signal is zero, to a maximum motor torque of the opposite sense.

The motor controller 9 receives as its input the torque assistance signal and produces currents that are fed to the motor to reproduce the desired torque at the motor drive shaft 2. It is this assistance torque applied to the steering column shaft 5 that reduces the effort needed by the driver to turn the wheel.

Normal Mode of Operation

Figure 3:
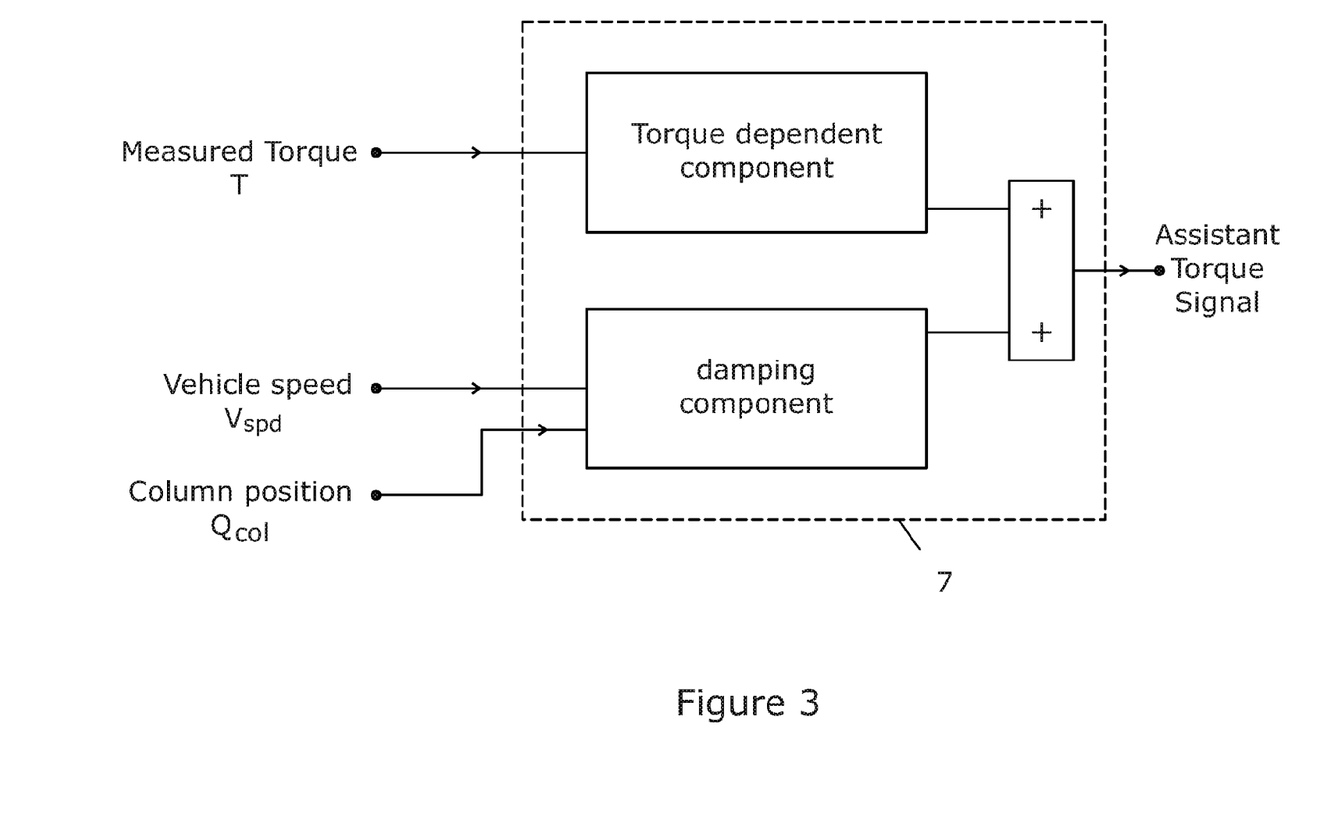
FIG. 3 is a block diagram illustrating the functional steps undertaken by the signal processor of the system of FIG. 1 in the normal mode.

The function of the signal processing unit 7 in the normal mode is shown in FIG. 3. The torque demand signal 8 is made up of at least two components or terms. The first component is a torque component which depends on the amount of torque a driver is applying to the steering column through the wheel.

The second component or term is a damping component which is provided in order to improve the steering feel and/or enhance the safety of the system. Other torque components can be used in addition, for example to help to counter the effects of cross winds on the vehicle which can cause it to stray from an intended path.

The assistance torque signal is therefore derived as a function of the torque in the steering as measured by the torque sensor 6. The relationship between the measured torque and the assistance signal is essentially linear. However, other possible relationships may be used to map the torque to the assistance signal. In both cases, as torque increases the magnitude of the assistance signal increases. It will also be understood that the assistance torque signal may be dependent upon other parameters such as vehicle speed if required. In that case it is typical to reduce the value of the assistance torque signal at high speeds to enhance stability and increase it at very low speeds to ease parking manoeuvres.

Fault Mode of Operation

In the event that the torque sensor has a fault, or the signal from the torque sensor is otherwise deemed unreliable, the system will switch to operate in a second mode called a fault mode of operation. In this second mode the assistance torque is generated independent of the measured torque. Instead, an estimated amount of assistance torque is generated based on the angular position of the steering wheel.

Figure 4:
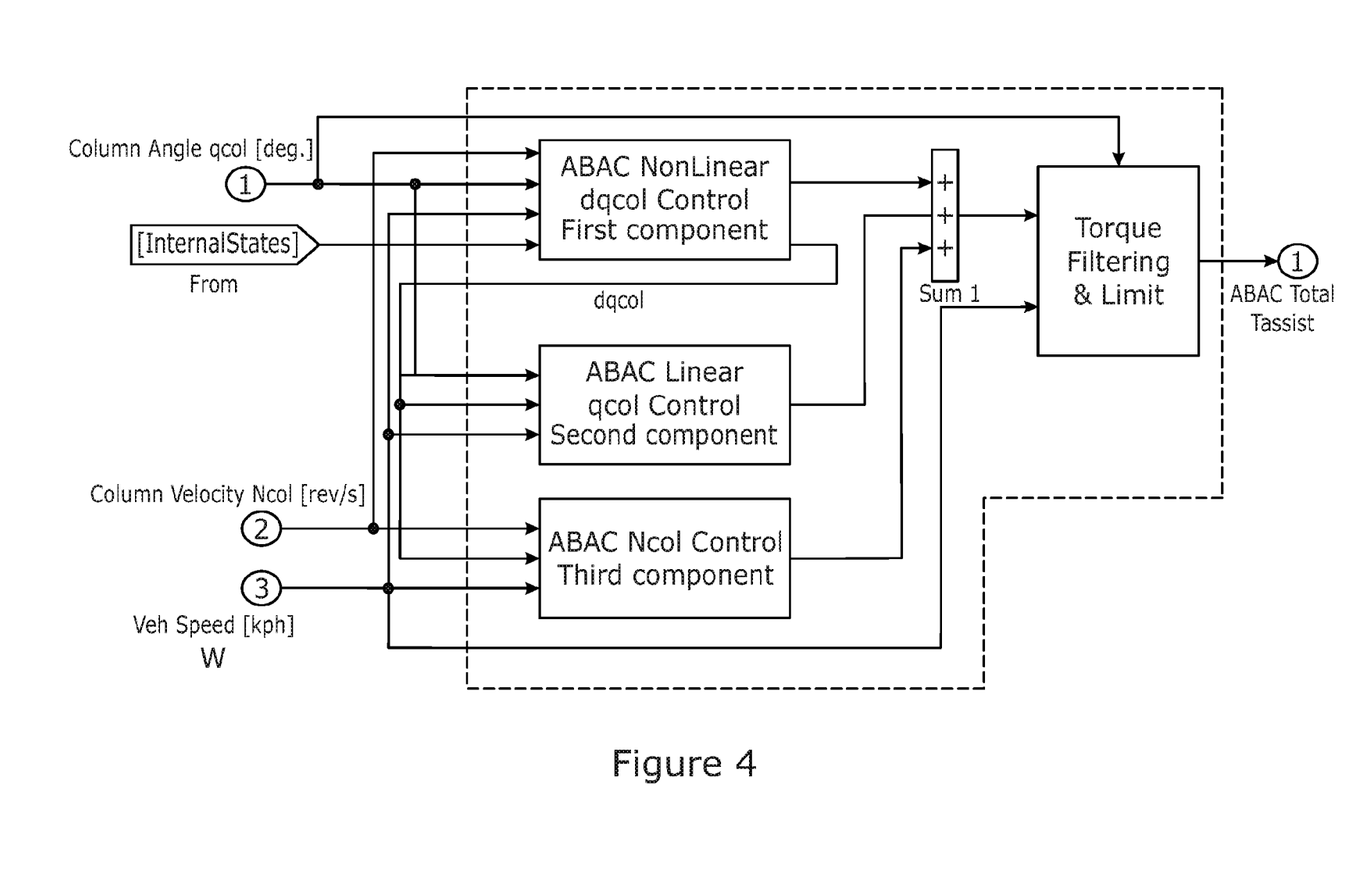
FIG. 4 is a block diagram illustrating the functional steps undertaken by the signal processor of the system of FIG. 1 in the fault mode.

FIG. 4 shows the functionality of the signal processing unit 7 in this mode and the control variables that are used by the signal processor to generate the assistance torque when operating in the second mode. As can be seen, the torque sensor signals are no longer used as an input in this mode. Instead, steering column angular position qcol, the vehicle speed vspd and vehicle lateral acceleration Vacc, and the steering column or motor angular velocity Ncol are used.

It can be seen in FIG. 4 that the signal processor produces an assistance torque signal 8 that is derived from three distinct components or terms, each of which is generated by a sub-unit of the signal processor. The three terms are as follows:

(a) a first term which varies as a function of the position Dqcol of the steering column relative to a changing datum, (b) a second term which varies as a function of the position of the steering column relative to the fixed datum corresponding to the vehicle steering pointing straight ahead; and (c) an optional third term which varies as a function of the velocity Ncol of the steering column.

These three terms are combined at sub-unit 12 within the signal processor to form the final assistance torque signal 8.

Figure 5:
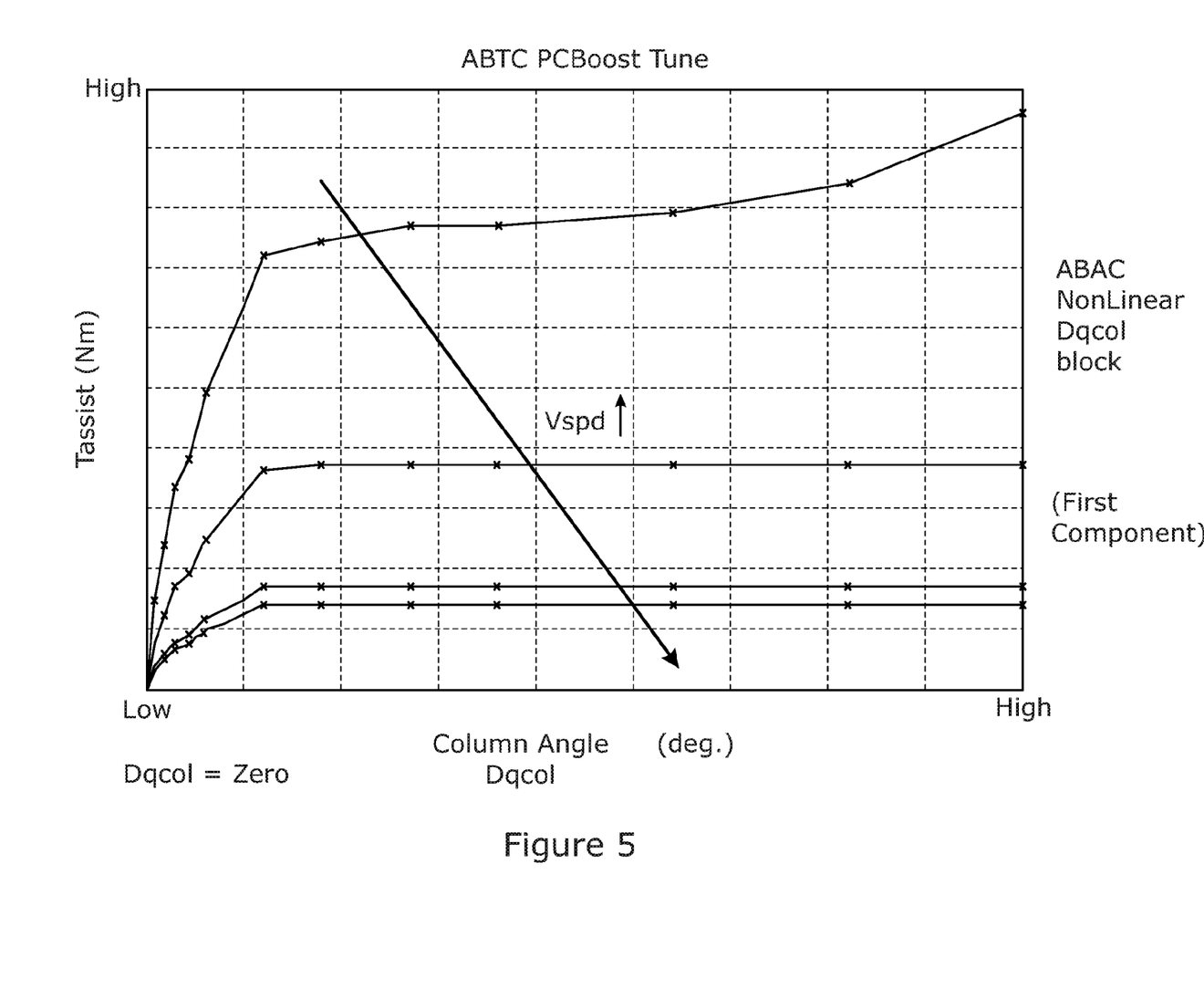
FIG. 5 is a graph showing the variation in the value of a first term generated in the process of producing the assistance torque signal as a function of the position of the steering relative to a changeable datum.

The first term is shown in FIG. 5 of the drawings. The graph shows on the X axis the position Dqcol of the steering relative to the changing datum and y axis is the value of the first term, expressed as a torque value in Nm. This component will be mapped on Dqcol and have axis going from 0 to high as the Dqcol will be reset on direction change. As can be seen this term is also modified as a function of vehicle speed, being scaled back at increasing vehicle speeds.

The key characteristic of the first term is that there is a rapid increase in the torque on initial movement away from the datum, followed by a reduced increase or saturation (no further increase) on further movement.

The changing datum from which Dqcol is measured is reset whenever the direction of rotation of the steering changes, a reversal of direction. As long at the steering is moving in one direction, or has come to rest, the datum will not be reset but will retain its last datum value. Thus, during use of the vehicle the position of the datum will be reset from time to time whenever the driver holds the steering at one fixed angle for a given time.

For example, the steering may be rotated away from the straight ahead position by the driver, and after rotating through one half a rotations in the clockwise direction is held stationary. The datum not be reset to 180 degrees from the straight ahead position as there is no reversal.

When stationary, the amount of assistance needed can be dropped off and so the value of the first component is reduced steadily over time towards zero.

If the driver starts to turn away further, in the same direction away from the straight ahead position, then the first component will again be applied in line with the mapped value.

If the steering is then moved in the return direction, back towards straight ahead, the datum is reset and the first component is calculated based on the graph using the new datum.

Figure 6:
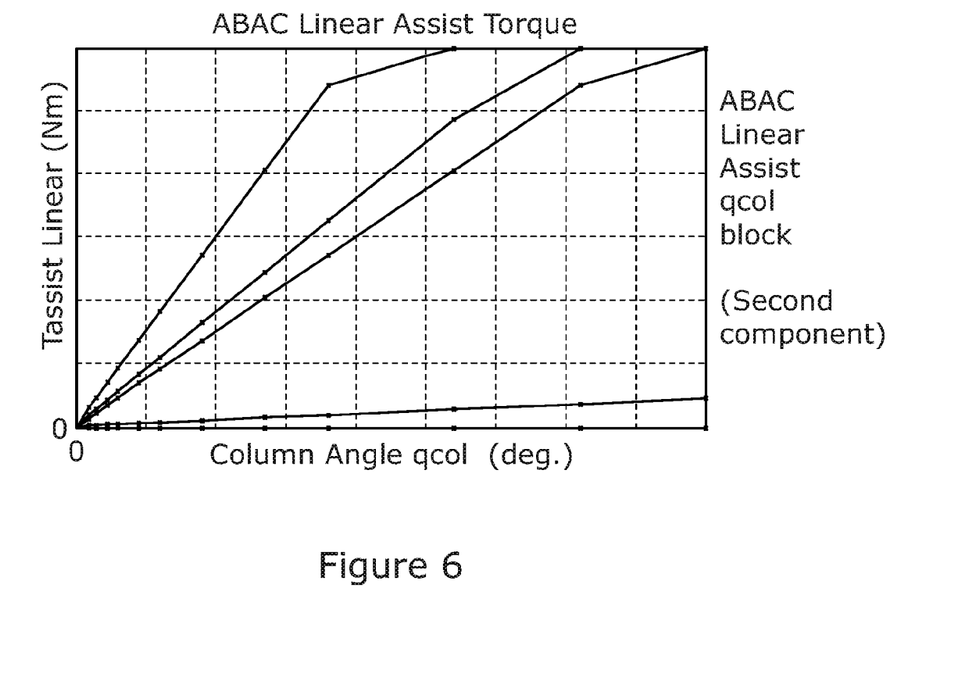
FIG. 6 is a graph showing the variation in the value of a second term generated in the process of producing the assistance torque as a function of the absolute column angle relative to the straight ahead position.

The second component or term is shown in FIG. 6. In this graph, the x axis indicates the steering position relative to the fixed straight ahead position, qcol, against on the y axis the value of the second term as a torque in newton metres. It can be seen that the second component varies in a piecewise linear manner, increasing as the steering moves away from the straight ahead position. The value is based on absolute steering angle and is symmetric across the straight ahead position, and so can be generated using a simple map that goes only from 0 to High. Multiple traces are shown as this component can also be scaled or limited with vehicle speed as with the first term.

Figure 7:
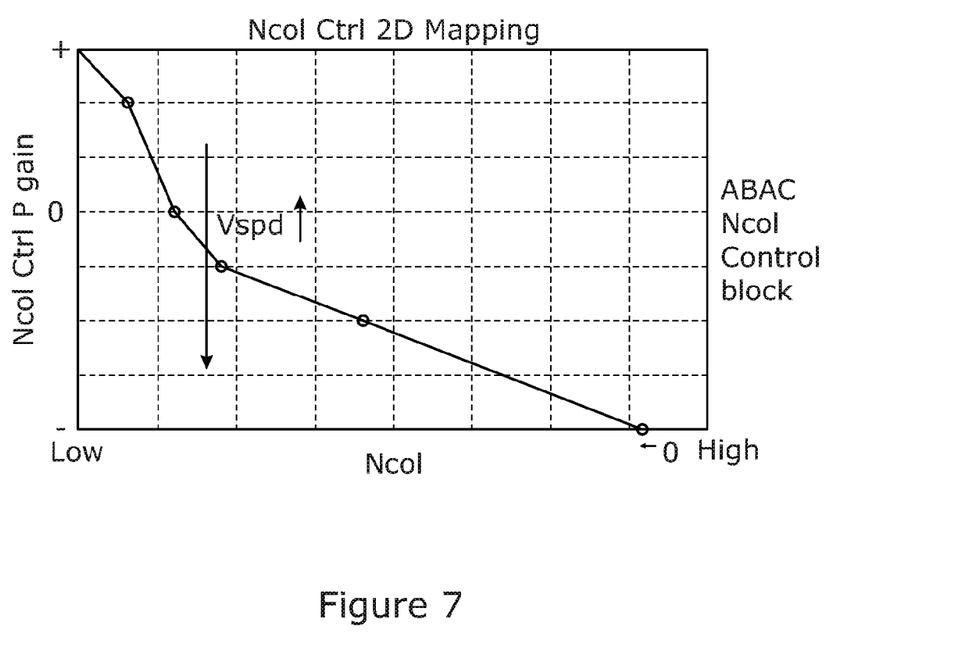
FIG. 7 is a graph showing the variation in the value of a gain term as a function of the column velocity Ncol.

The third component or term is shown in FIG. 7. This term is generally a damping term. The graph shows in the X axis the steering velocity Ncol varying from low to high speed, and on the Y axis the value of the third term expressed as a gain. Again this is also dependent on the vehicle speed in this example.

This third term damping can be used to provide an additional initial kick, kind of derivative term for the initial angle movement, as the vehicle moves away from the straight ahead position but then it later turns into damping control for larger angles. This configuration is used mostly at park, where the inertia to be overcome is higher, for the higher vehicle speeds it is damping all across the steering range.

The transfer functions for each of the three terms may be stored in a memory associated with the signal processing unit 7, as a look up table or map, or as mathematical equations, or as a mixture. Where a map is used, the signal processor may interpolate any required intermediate values. Where an equation is used, it is conveniently expressed as a set of piecewise linear equations.

Figure 8:
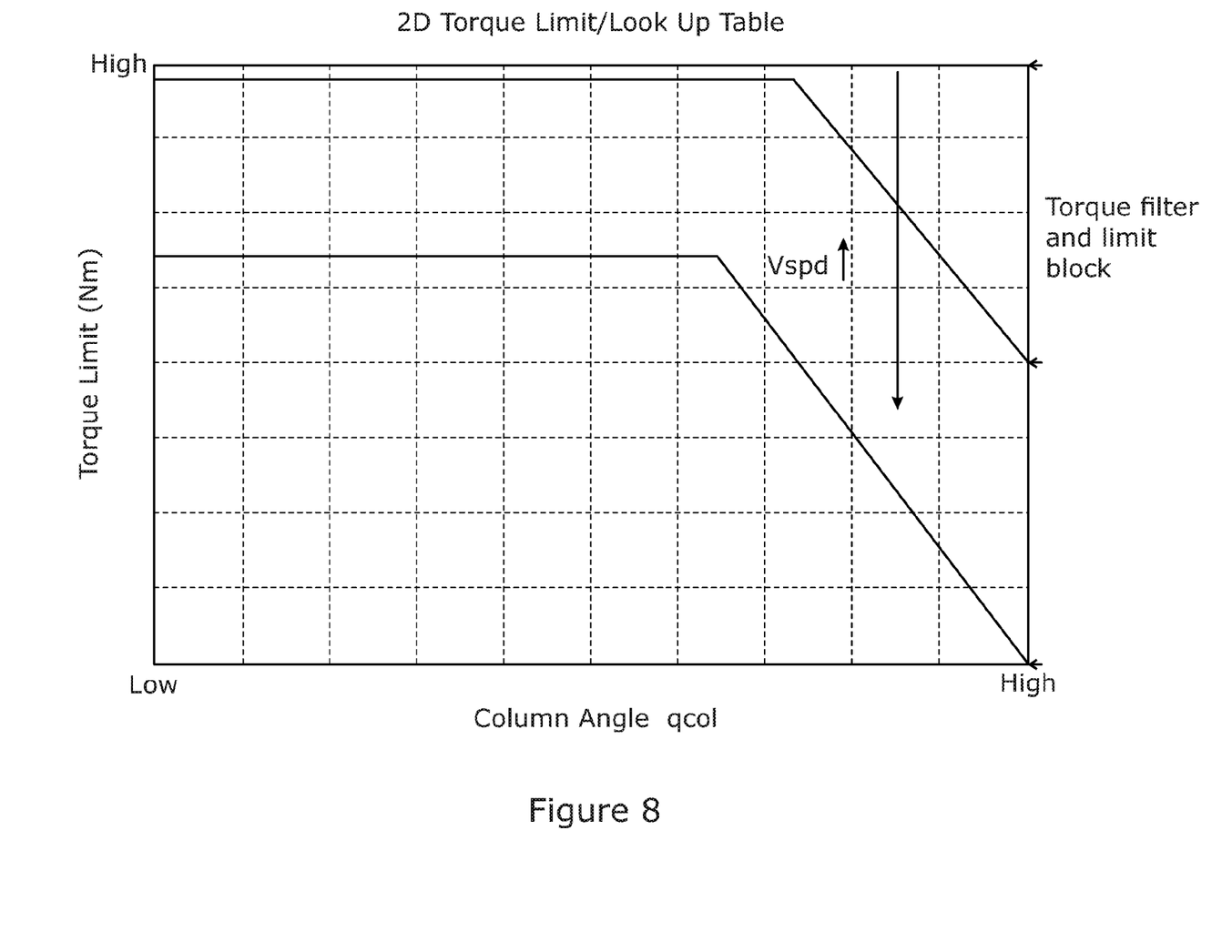
FIG. 8 is a graph showing the variation in a torque limit applied to the assistance torque signal value as a function of column angle relative to the straight ahead position.

The three terms are fed to a summation block as shown in FIG. 4 (question—is it right that the first two are added to the gain signal?). The output of the summation block is then, in this example, modified by a further torque limit term that applies a limit as a function of vehicle speed and column angle qcol as shown in FIG. 8

Whenever the signal processor deems that the datum is to be reset, the value of the assistance torque that is generated at the time will gradually be reduced to blend to the value that is determined according to the sum of the three components (Question—is this right?)

The output from the signal processor 7 in the fault mode may then be passed to the drive circuit to produce appropriate drive currents for the motor.

In use, a monitor is provided that determines if a reliable torque signal is available and to choose which mode to operate within. A warning may be issued to the driver when the system is operating in the fault mode.

In accordance with the provisions of the patent statutes, the principle and mode of operation of this invention have been explained and illustrated in its preferred embodiments.

However, it must be understood that this invention may be practiced otherwise than as specifically explained and illustrated without departing from its spirit or scope.

The invention claimed is:

1. A method of operating an electric power assisted steering system in which an electric motor applies an assistance torque to a part of the steering system as a function of an assistance torque signal, the assistance torque reducing a force required by a driver to turn a steering wheel, the method comprising:

during normal operation generating an assistance torque signal that is dependent on a torque applied by the driver, and during a fault operation in which the torque applied by the driver is not reliably known to the system generating an assistance torque signal that is derived from a first component, or term, that has a value that varies as a function of an angular position of the steering relative to a changeable datum, the angular position of the changeable datum being updated in the event that a direction of rotation of the steering changes: and further including the step of resetting the changeable datum when the direction of rotation of the steering changes but only if one or more additional conditions are met, wherein the additional condition is dependent of the value of the assistance torque signal at the time of the direction of rotation of the steering changes.

2. A method of operating an electric power assisted steering system in which an electric motor applies an assistance torque to a part of the steering system as a function of an assistance torque signal, the assistance torgue reducing a force required by a driver to turn a steering wheel, the method comprising: during normal operation generating an assistance torque signal that is dependent on a torque applied by the driver, and during a fault operation in which the torque applied by the driver is not reliably known to the system generating an assistance torque signal that is derived from a first component, or term, that has a value that varies as a function of an angular position of the steering relative to a changeable datum, the angular position of the changeable datum being updated in the event that a direction of rotation of the steering changes, and determining the changeable datum when a normal mode of operation is being used, ready to be employed in generating the assistance torque signal in the event that the assistance torque signal is lost or becomes unreliable.

3. A method of operating an electric power assisted steering system in which an electric motor applies an assistance torque to a part of the steering system as a function of an assistance torque signal, the assistance torque reducing a force required by a driver to turn a steering wheel, the method comprising:

during normal operation, generating an assistance torque signal that is dependent on a torque applied by the driver:

durinq a fault operation in which the torque applied by the driver is not reliably known to the system generating an assistance torque signal that is derived from a first component, or term, that has a value that varies as a function of an angular position of the steering relative to a changeable datum, the angular position of the changeable datum being updated in the event that a direction of rotation of the steering changes;

generating a second component or term that varies as a function of the position of the steering relative to a straight ahead position, the assistance torque being derived from a combination of the first component with the second component; and producing an assistance torque signal in the fault operation that includes a step of summing the first component and the second component.

* * * * *